Sept. 2, 1969  F. CHRISTENSEN  3,464,601
METHOD OF AND MACHINE FOR AUTOMATICALLY
CONTINUOUSLY MAKING RIBBON BOWS
Filed Oct. 24, 1965  12 Sheets-Sheet 1
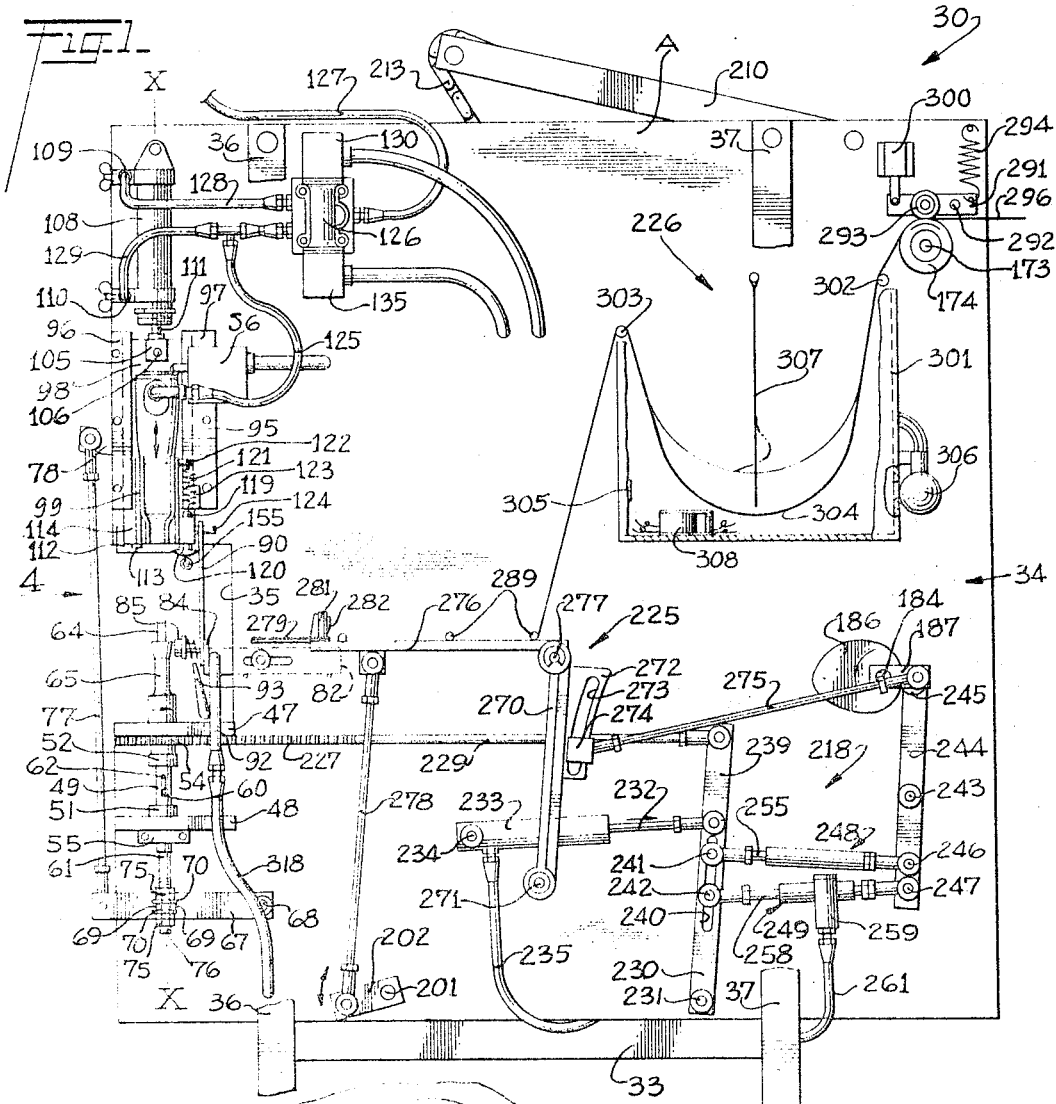
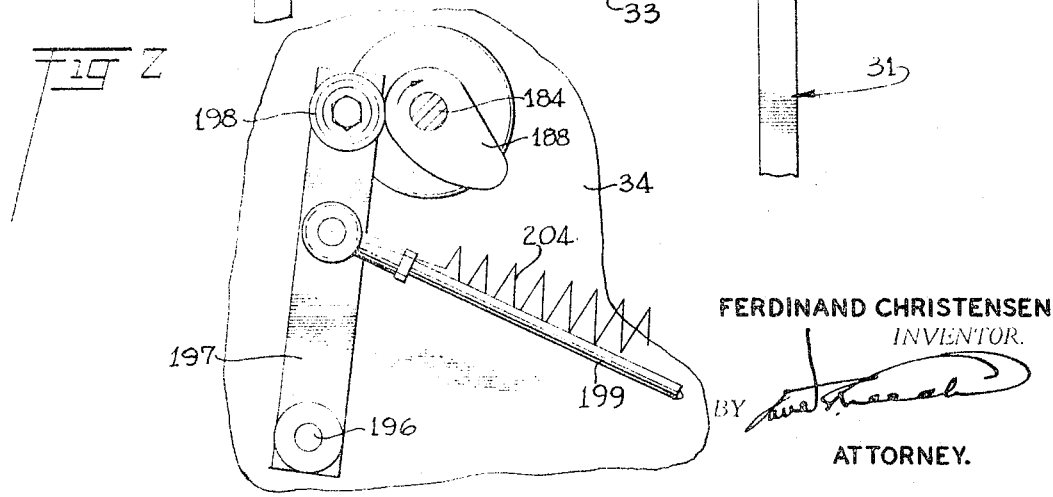
FERDINAND CHRISTENSEN,
INVENTOR.
BY
ATTORNEY.

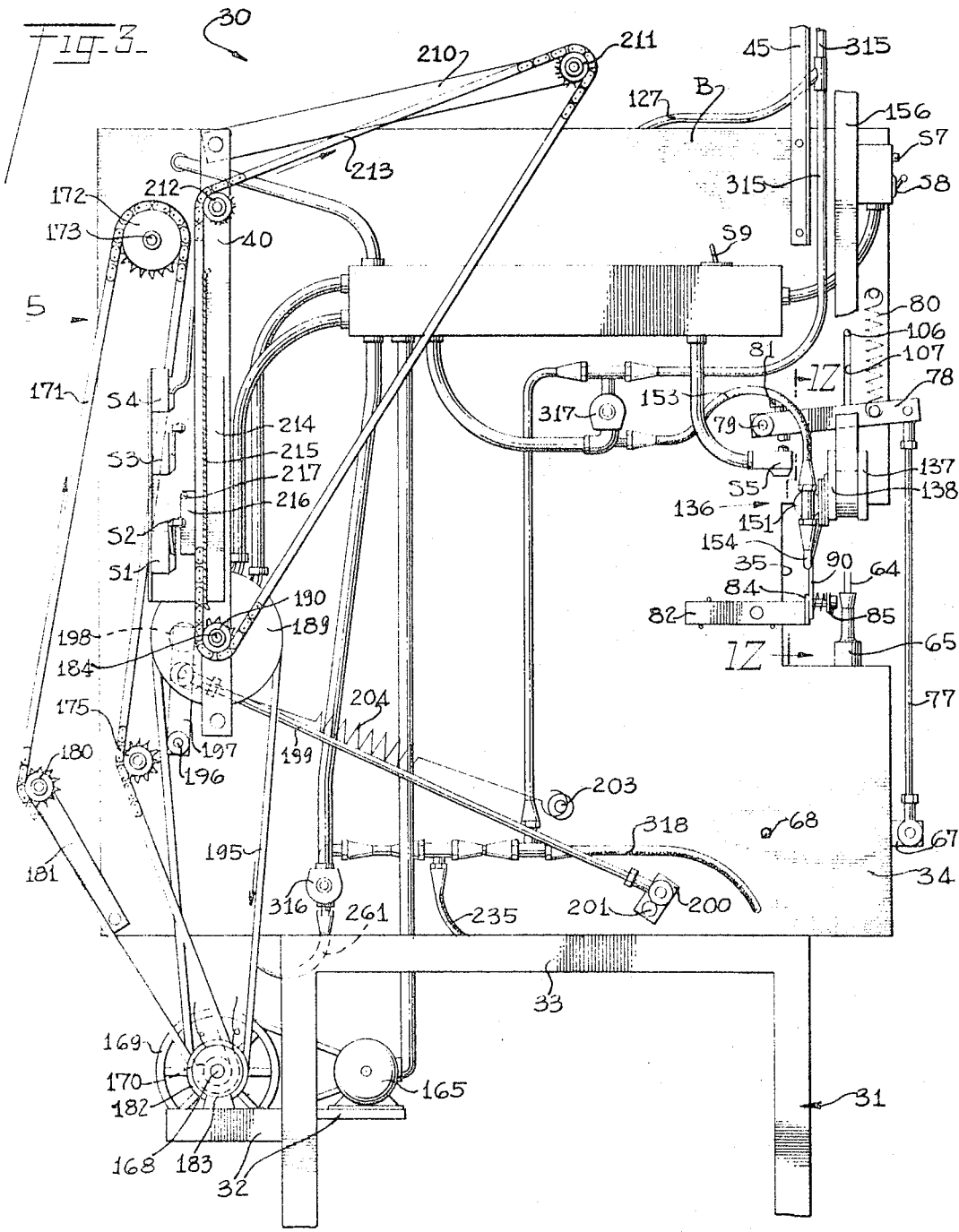

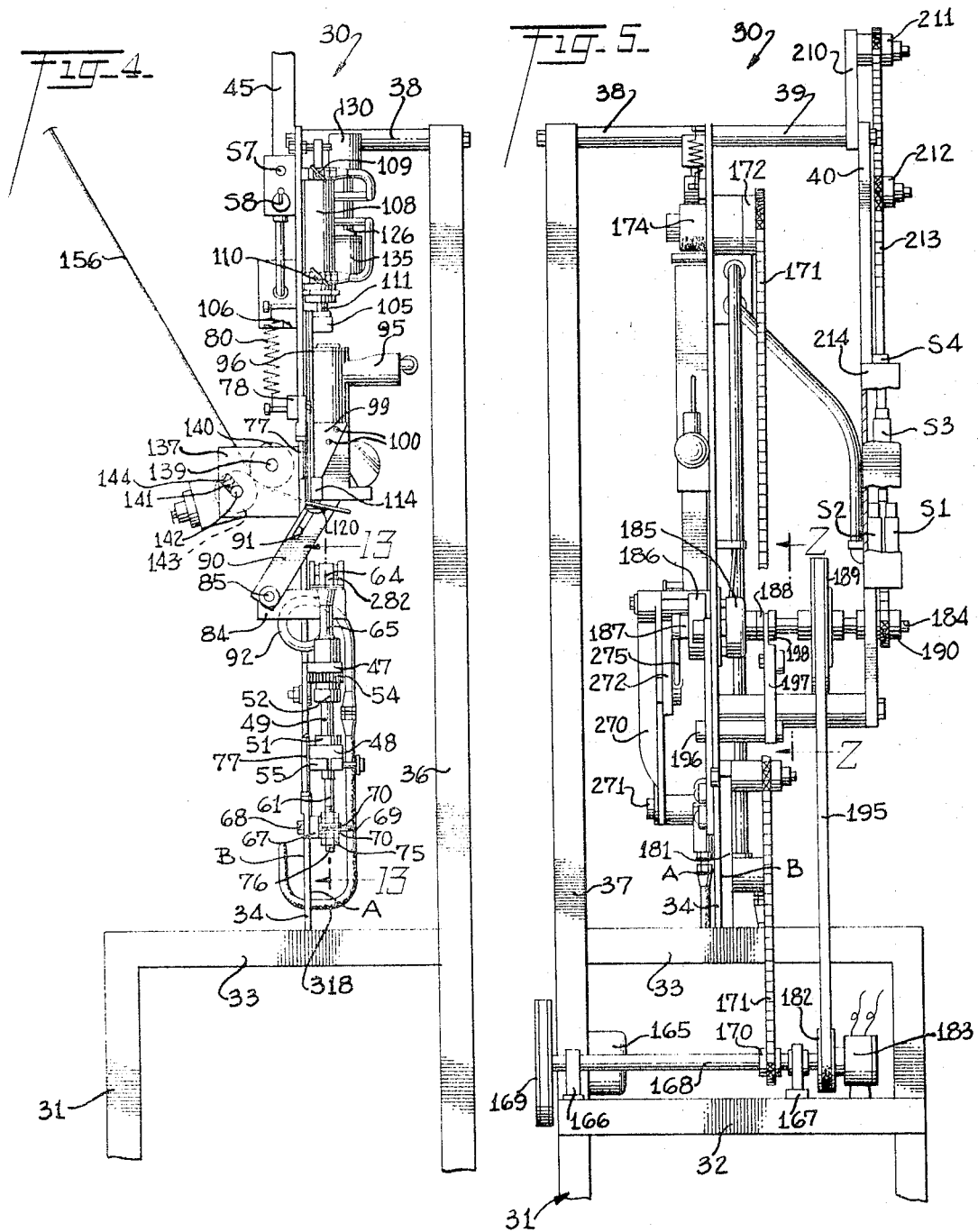

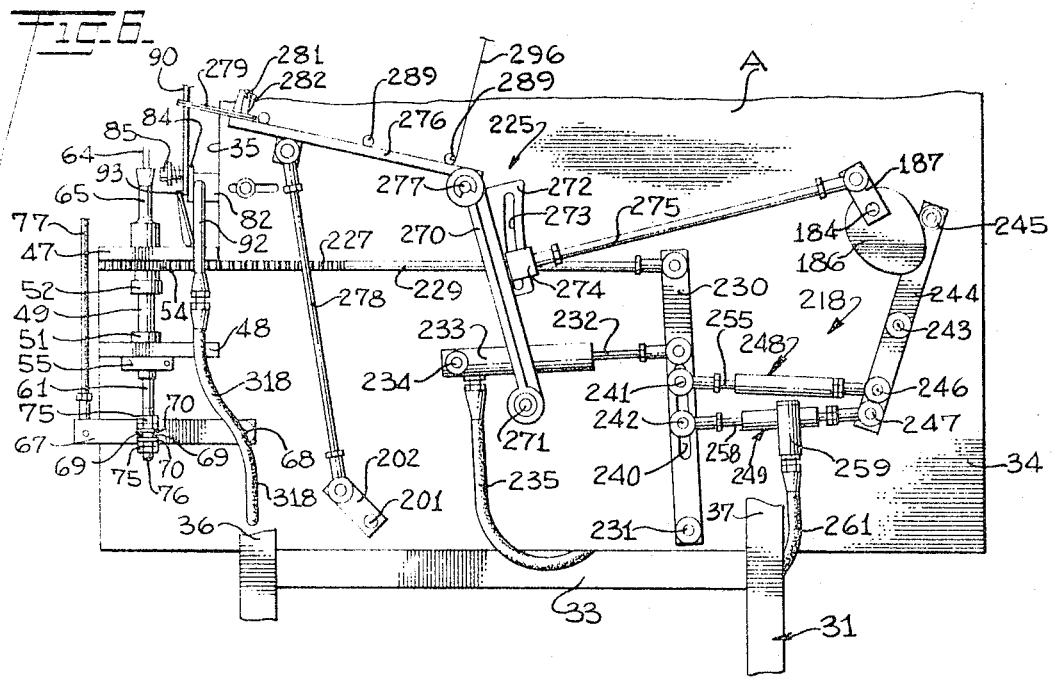
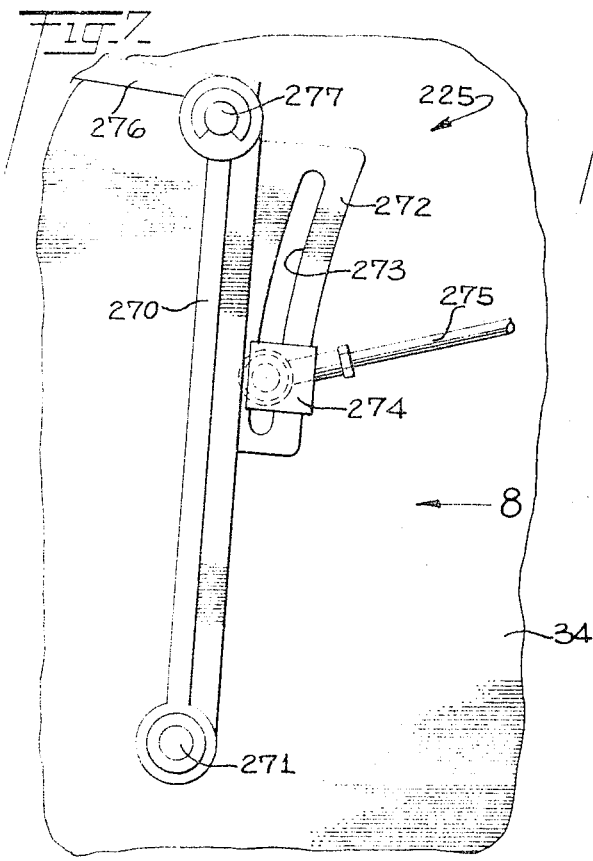
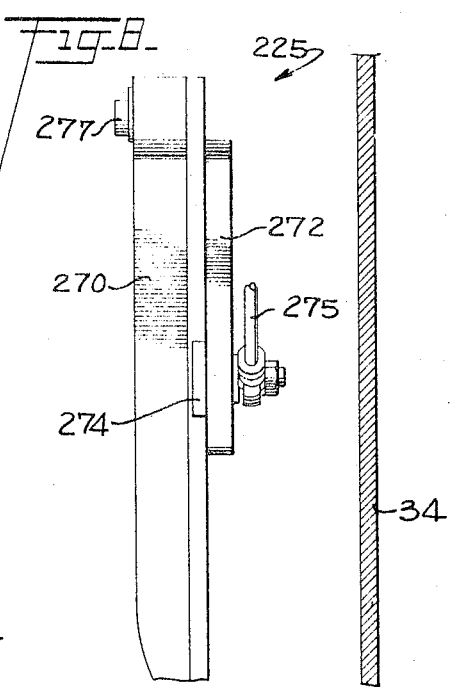

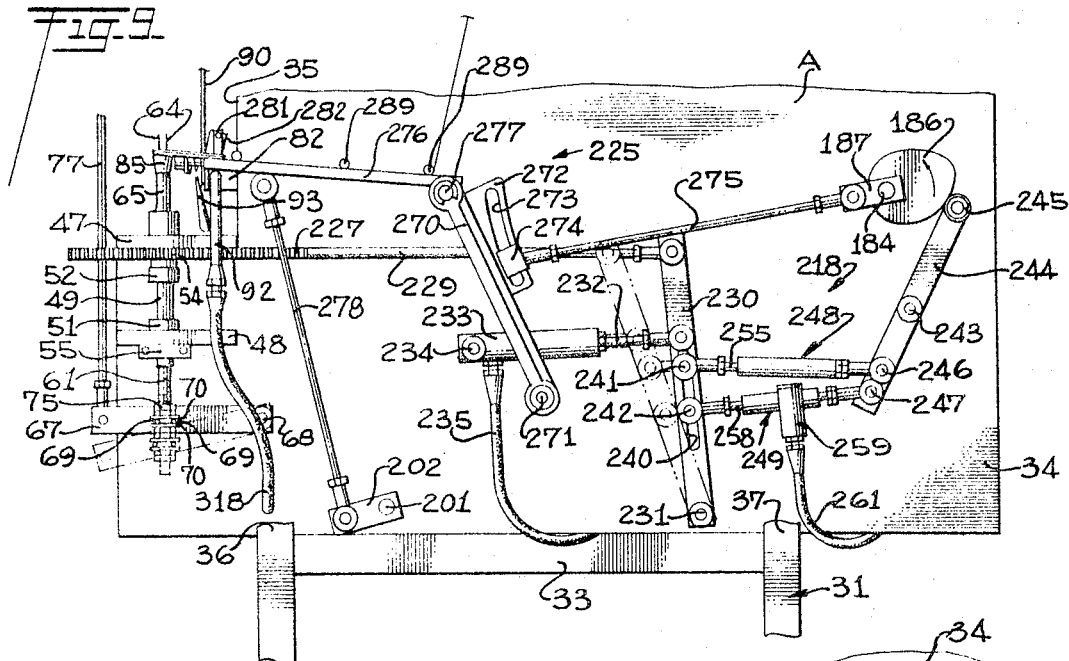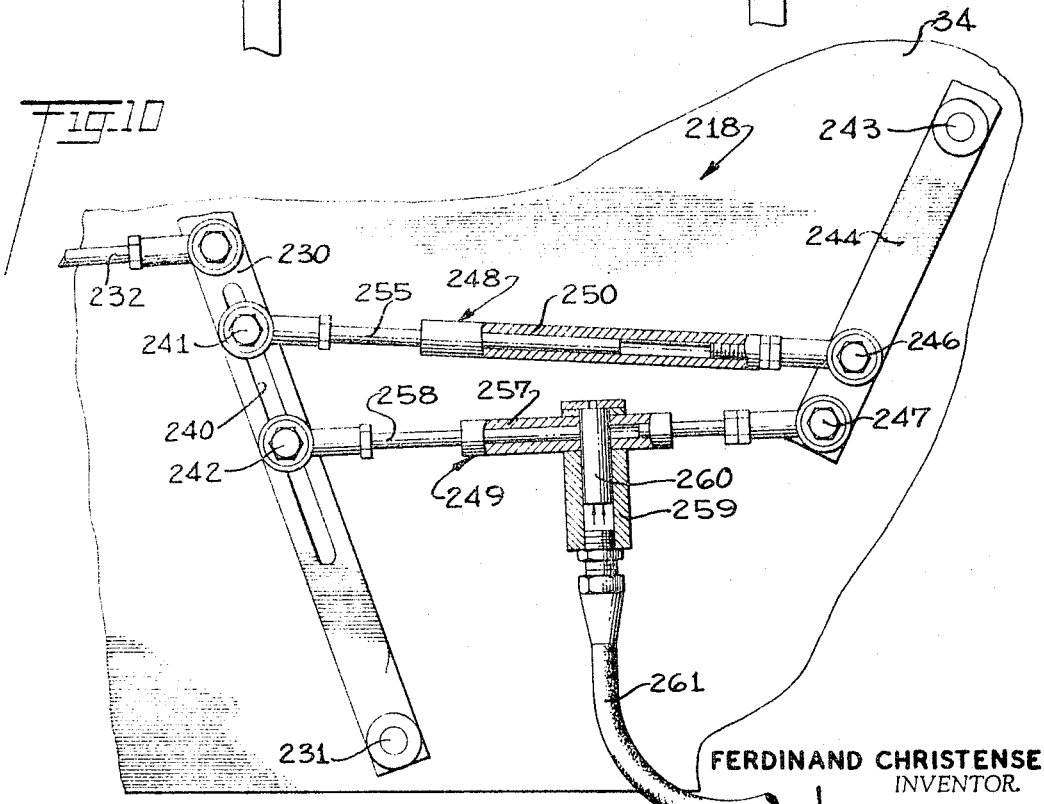

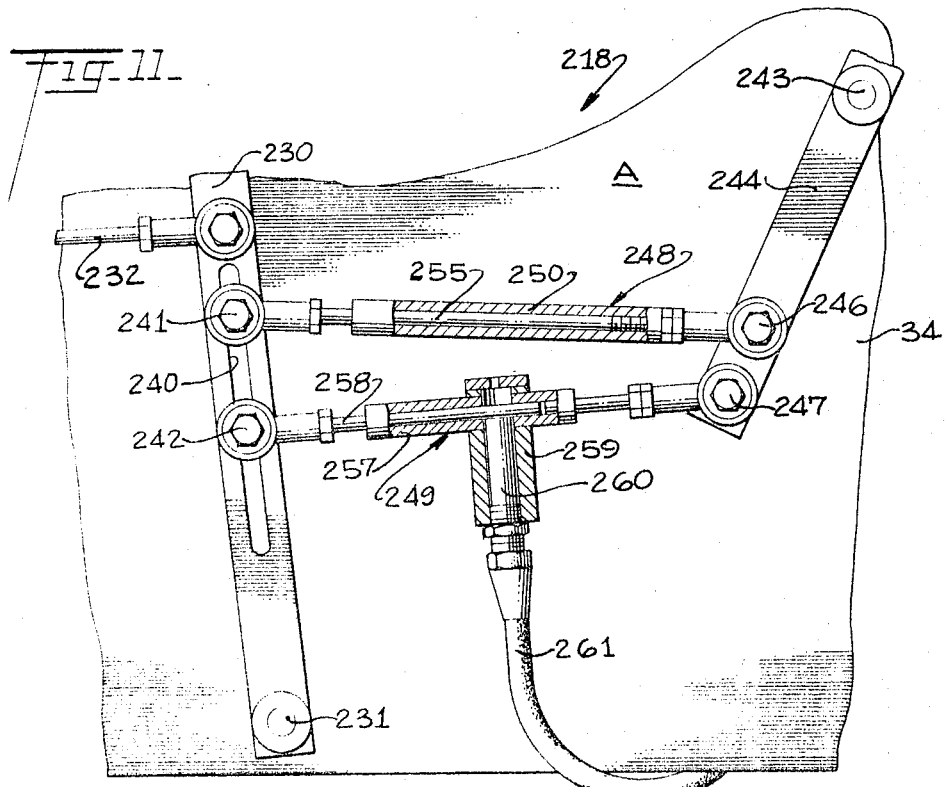

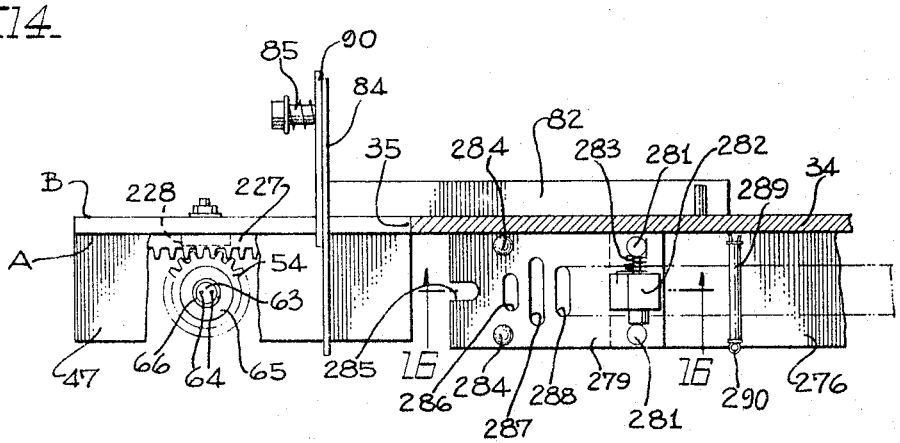
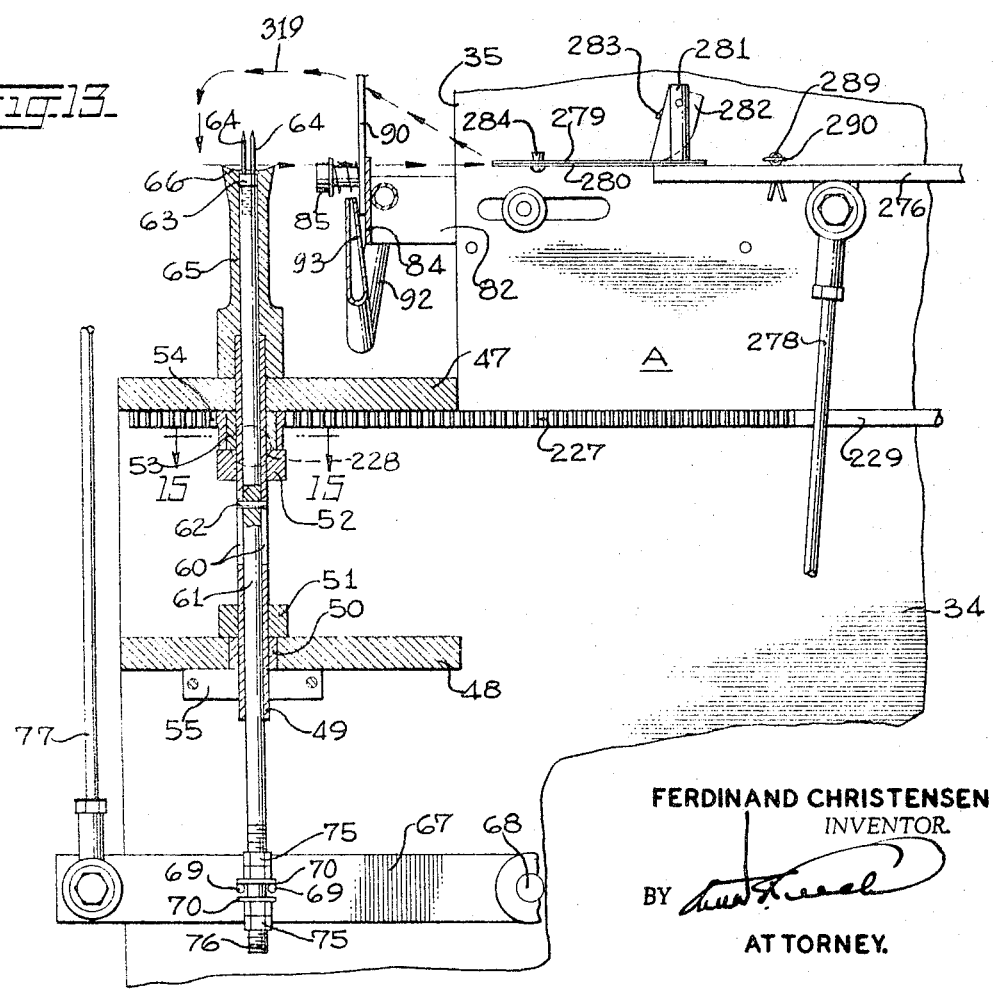

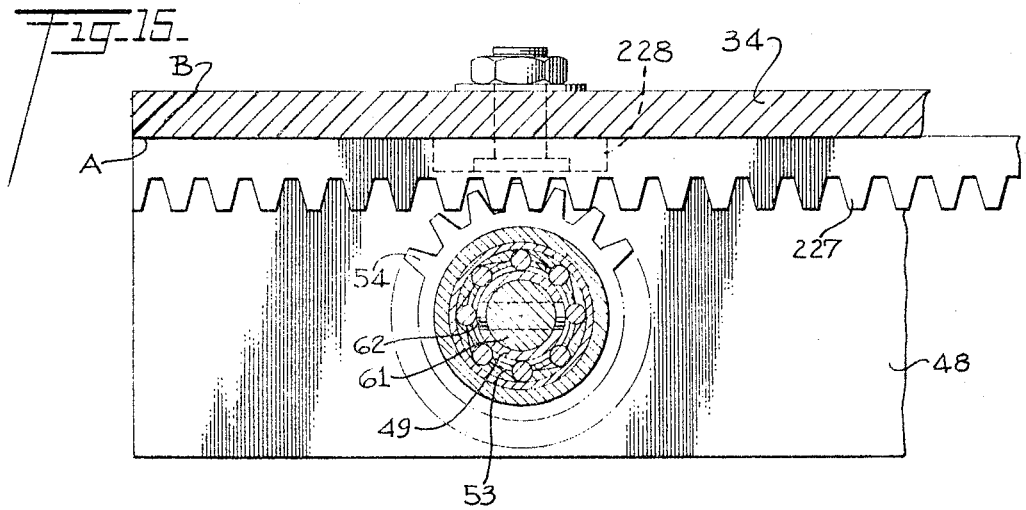
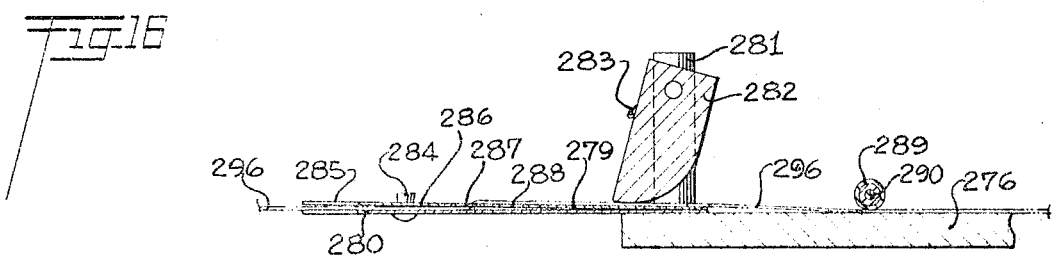
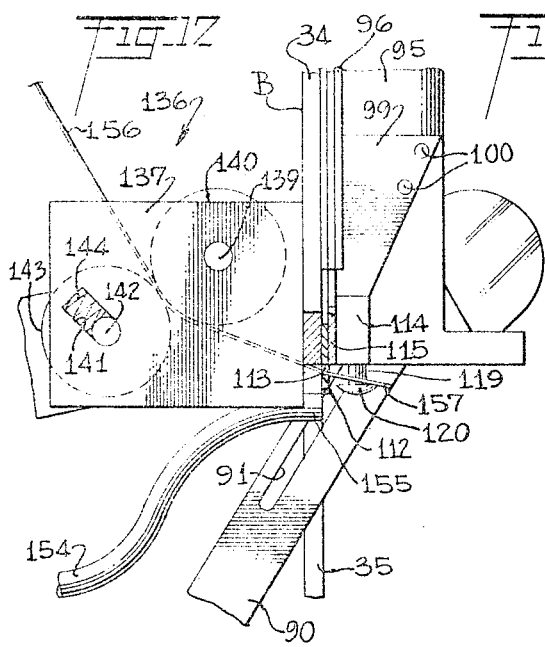
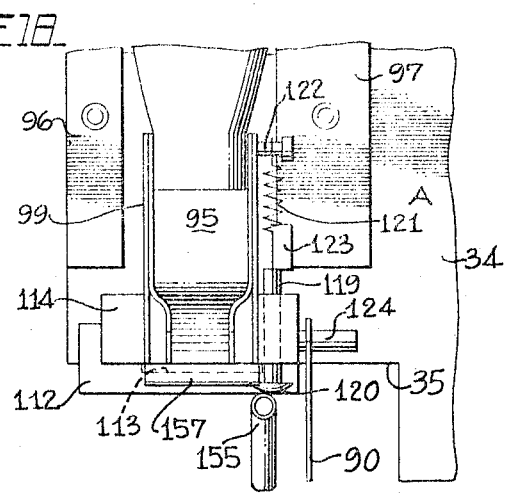
FERDINAND CHRISTENSEN,
INVENTOR.
ATTORNEY.

FERDINAND CHRISTENSEN,
INVENTOR.

BY

ATTORNEY

Sept. 2, 1969     F. CHRISTENSEN     3,464,601
METHOD OF AND MACHINE FOR AUTOMATICALLY
CONTINUOUSLY MAKING RIBBON BOWS
Filed Oct. 24, 1965     12 Sheets-Sheet 10
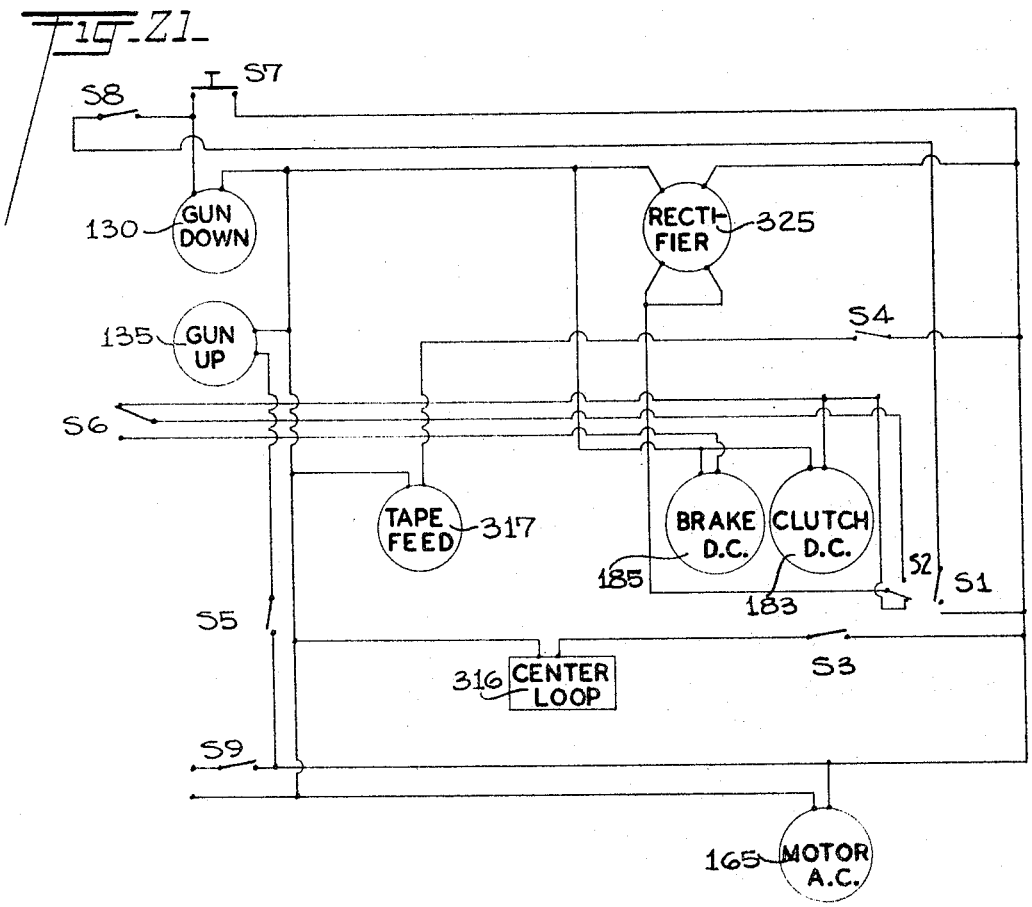
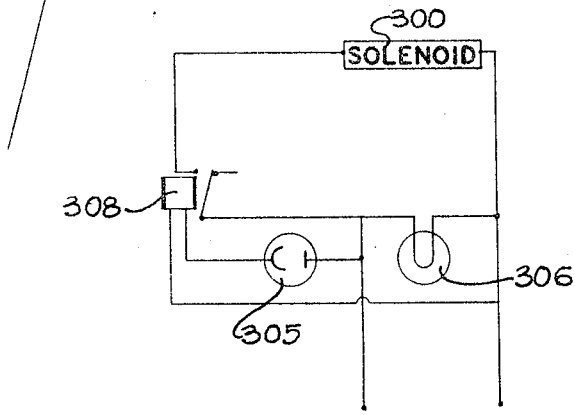
FERDINAND CHRISTENSEN,
INVENTOR.
BY
ATTORNEY.

Sept. 2, 1969  F. CHRISTENSEN  3,464,601
METHOD OF AND MACHINE FOR AUTOMATICALLY
CONTINUOUSLY MAKING RIBBON BOWS
Filed Oct. 24, 1965  12 Sheets-Sheet 11
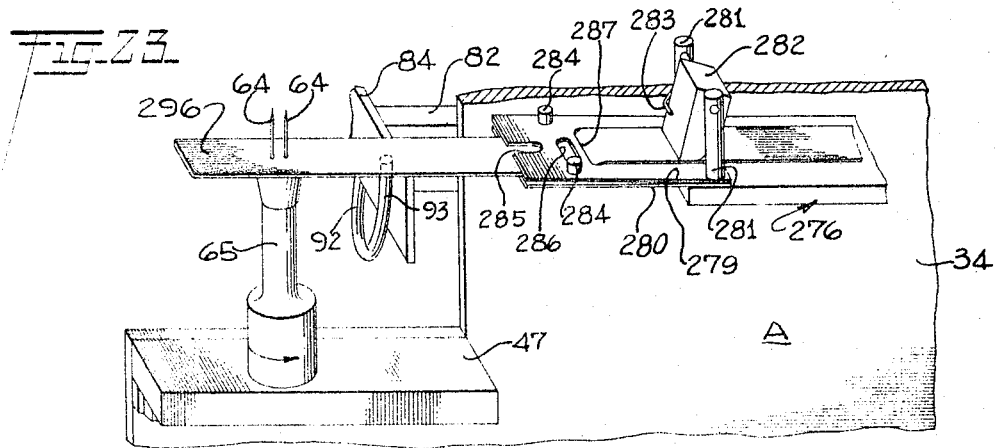
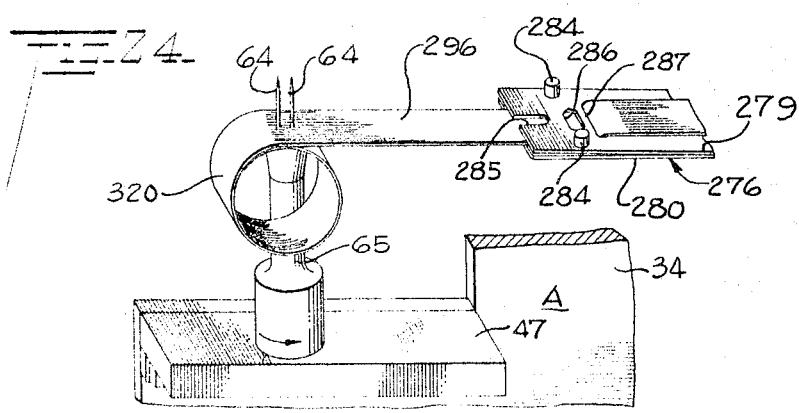
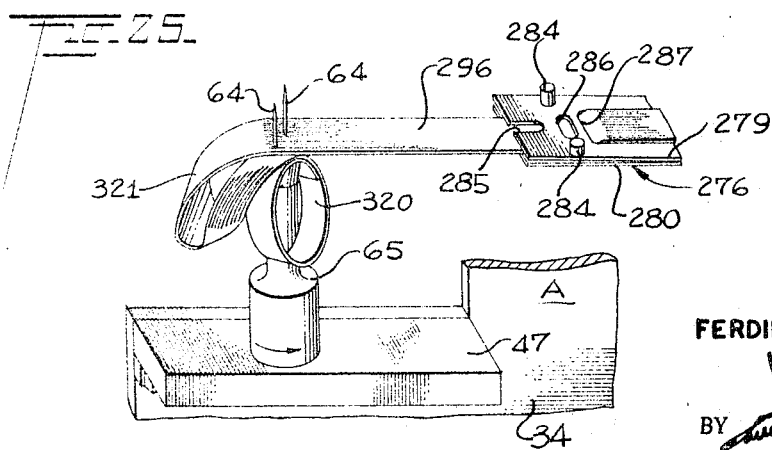
FERDINAND CHRISTENSEN,
INVENTOR.
BY 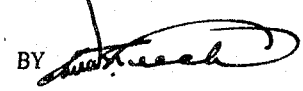
ATTORNEY.

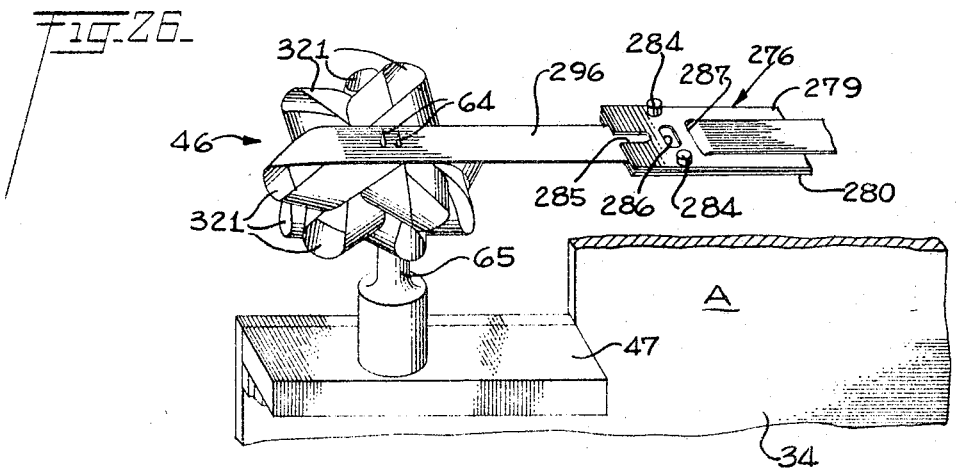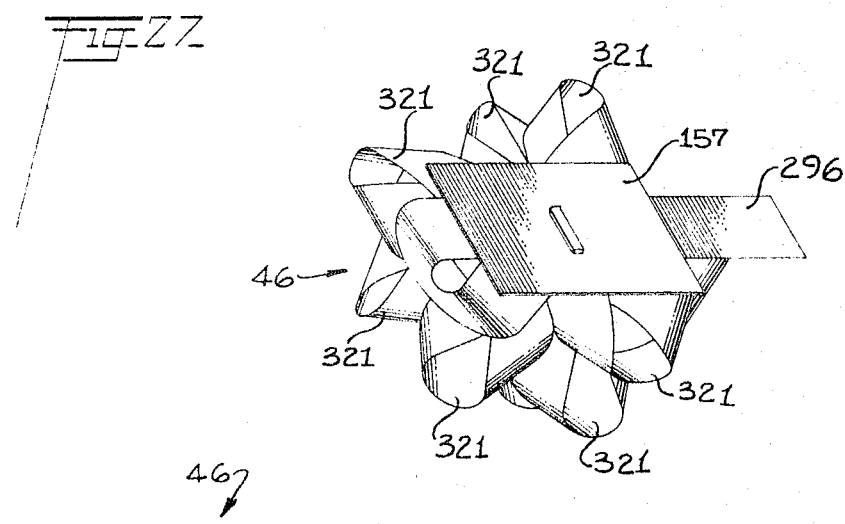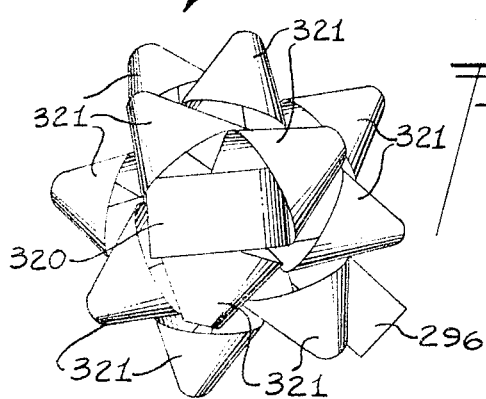

United States Patent Office 3,464,601
Patented Sept. 2, 1969

3,464,601
METHOD OF AND MACHINE FOR AUTOMATICALLY CONTINUOUSLY MAKING RIBBON BOWS
Ferdinand Christensen, North Whittier, Calif.
(211 N. Puente Ave., City of Industry, Calif. 91744)
Filed Oct. 24, 1965, Ser. No. 504,322
Int. Cl. A41h 43/00; A41g 1/02
U.S. Cl. 223—46                              7 Claims

ABSTRACT OF THE DISCLOSURE (A) A rotatable bow forming mandrel having a plurality of axially parallel needles extending therefrom, (B) means for automatically repeating the following series of steps (1) impaling a continuous ribbon on said needles, (2) providing slack in said ribbon sufficient to form a loop of a bow, and (3) rotating said mandrel to form said slack ribbon into such a loop, (C) means for halting said repetition when a rosette bow of ribbon of a given size has been formed symmetrical with said mandrel, and (D) means functioning automatically upon the completion of each such bow to concurrently perform the following steps (4) withdraw said needles from said ribbon portions impaled thereon, (5) staple said portions together, (6) cut the bow thus formed from said ribbons, and (7) initiate a repetition of said sequence of steps whereby said ribbon is automatically converted into a series of individual separate bows.

BACKGROUND OF THE INVENTION

Field of the invention

The mass production of ribbon bows for holiday use in the decoration of gift packages.

Description of the prior art

The closest prior art appears in U.S. patents to Robert S. Kravig and Arnold E. Johnson, Nos. 3,112,240 and 2,933,223, and the patent to B. W. Bock et al., No. 3,249,269.

The Kravig patent, 2,933,223 and the Bock patent, 3,249,269 disclose bow making machines which are semiautomatic, are manually operated and require human interposition in the making of each bow, and are therefore unsuited for the automatic mass production of ribbon bows.

SUMMARY OF THE INVENTION

It is an object of the present invention to provide a method of and machine for manufacturing ribbon bows which receives ribbon from a relatively long roll thereof and operates to fully automatically convert this roll of ribbon into completed individual bows and at a relatively high rate of speed without the interposition of any human agency in the operation of the machine.

Another object of the invention is to provide such a method and machine which will automatically form such bows, the first loop of which will comprise a complete annular loop formed by automatically rotating the forming mandrel 360° and in which the subsequent loops of the bow are formed by automatically rotating the mandrel through a lesser angle of the order of 200° to 240° whereby all the loops of the bow following the initial loop are conoidal loops.

Yet another object of the invention is to provide such a machine which will apply a pressure adhesive tab on the back of each bow and staple the same to the bow so that the bow may utilize the pressure adhesive for a securing means in fastening the bow as to a gift package.

BRIEF DESCRIPTION OF THE DRAWINGS

FIG. 1 is a front elevational view of a preferred embodiment of the bow-making machine of the invention.

FIG. 2 is an enlarged vertical sectional detail view taken on the line 2—2 of FIG. 5.

FIG. 3 is a back elevational view of FIG. 1.

FIG. 4 is a side elevational view of FIG. 1 taken in the direction of arrow 4.

FIG. 5 is a side elevational view of FIG. 3 taken in the direction of arrow 5.

FIG. 6 is an operational view of the structure in the lower portion of FIG. 1 and illustrates the ribbon shuttle of the invention being elevated as it is advanced toward and over the bow-forming mandrel.

FIG. 7 is an enlarged detail view of the mechanism for controlling the size of the bow made by said machine.

FIG. 8 is an elevational view of FIG. 7 taken in the direction of arrow 8.

FIG. 9 is an operational view similar to FIG. 6 illustrating the shuttle mechanism at the point where the extremity of the ribbon shuttle moves down on top of the bow-forming mandrel to impale the ribbon on the bow-forming needles extending upwardly from the mandrel.

FIG. 10 is an enlarged detail view of the mechanism for automatically controlling the angle of rotation of the bow-forming mandrel whereby said mandrel is automatically rotated 360° during the first loop-forming sub-cycle in the formation of the bow whereby the loop so formed differs from the other loops making up said bow. This view illustrates said mechanism during said initial loop-forming sub-cycle.

FIG. 11 is a view similar to FIG. 10 illustrating said control mechanism during each of the subsequent loop-forming sub-cycles in each of which the mandrel is rotated uniformly through a much smaller angle in the order of 200° to 235°.

FIG. 12 is an enlarged detail sectional view taken on the line 12—12 of FIG. 3 and illustrates the pressure adhesive tab forming mechanism of said machine and the means for retaining a tab in place beneath the stapler of the machine during the operation of stapling said tab onto a bow. This view also shows the ribbon cutting scissors and the air blast nozzle for blasting a finished bow out of the machine at the conclusion of the bow-forming cycle.

FIG. 13 is an enlarged vertical sectional detail view taken on the line 13—13 of FIG. 4 and illustrates the interior structure of the bow-forming mandrel of the machine of the invention.

FIG. 14 is a horizontal sectional view which constitutes a plan view of FIG. 13 with a portion of the machine broken away to illustrate the rack and pinion mechanism for rotating said mandrel.

FIG. 15 is an enlarged horizontal detail sectional view taken on the line 15—15 of FIG. 13 and illustrating a unidirectional clutch employed in the invention.

FIG. 16 is an enlarged vertical sectional view taken on the line 16—16 of FIG. 14 which illustrates the structure of the ribbon shuttle.

FIG. 17 is an enlarged detail fragmentary sectional view of the elements shown in FIG. 12 and is taken from the opposite side of the tab tape feed mechanism.

FIG. 18 is a front elevational view of FIG. 17.

FIG. 21 is a wiring diagram of the electric system of the machine of the invention.

FIG. 22 is a wiring diagram of the photoelectric control for the feeding of ribbon in said machine.

FIG. 23 is a fragmentary enlarged perspective view of the first operational step in the forming of a bow which causes the impaling of the terminal end portion of the ribbon fed through the ribbon shuttle onto the bow-forming needles of the machine. This view shows the shuttle pulling away from said needles to cause a length of ribbon to be paid out between the needles and the shuttle for forming the first loop of the bow.

FIG. 24 is a view similar to FIG. 23 and illustrates the withdrawal of the ribbon shuttle from over the bow-forming mandrel following the formation of the first loop of the bow which is an annular one-turn coil of said ribbon, though said coil is slightly deflected due to its having to by-pass the mandrel.

FIG. 25 is a view similar to FIG. 24 and illustrates the ribbon shuttle moving away from the bow - forming needles after having impaled said ribbon thereon to complete formation of the second loop of the bow which loop is conoidal in character as are all of the subsequent loops formed in producing said bow.

FIG. 26 is a view similar to FIG. 25 and illustrates the ribbon shuttle pulling away from the bow-forming mandrel at the conclusion of the formation of a bow on said mandrel and just prior to the descending of the stapling gun onto said bow and the withdrawal of the needles simultaneously from the bow allowing the gun to compress the overlapping portions of the ribbon forming the bow together on top of the mandrel and staple these portions together while the ribbon is cut by the scissors provided for this and an adhesive paper tab is applied by the staple to the back of the bow.

FIG. 27 is an enlarged perspective view of the bow illustrated in FIG. 26 after the steps above noted have been performed as this completed bow is ejected from the machine of the invention.

FIG. 28 is a perspective view of the bow shown in FIG. 27 and illustrates how the initial loop formed in the manufacture of said bow hides the staple employed in securing the parts of said bow together.

DESCRIPTION OF THE PREFERRED EMBODIMENT

Figure 20:
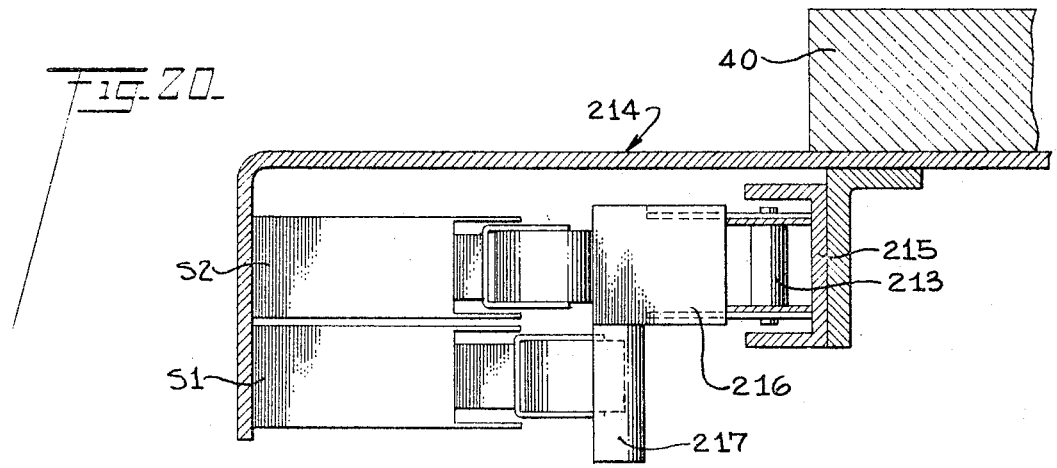
FIG. 20 is a plan view of FIG. 19.

Referring specifically to the drawing, and particularly to FIGS. 1, 3, 4 and 5, the apparatus of the invention is there disclosed as embodied in a machine 30 having a structural steel base 31 including a lower deck 32 and an upper deck 33 on which a master frame plate 34 is vertically mounted. The latter plate is rectangular and has a rectangular recess 35 formed in one of the vertical edges thereof. Angle iron frame posts 36 and 37 extend upwardly from two corners of the base 31 and are connected at their upper ends with the upper edge of plate 34 by horizontal spacers 38.

For convenience the side face of plate 34 to which spacers 38 connect will be referred to as face A and the opposite face of said plate will be referred to as face B.

Mounted at its ends on spacers 39 on plate 34 so as to be spaced outwardly from face B thereof is a vertical bar 40.

Mounted on plate 34 in the upper right corner of face B thereof and extending upwardly is an angle iron standard 45 the purpose of which will be made clear hereinafter.

Inasmuch as the machine 30 is provided for the express purpose of manufacturing a ribbon bow 46, top and bottom perspective views of which are shown in FIGS. 28 and 27 respectively, the parts of machine 30 which are disposed on the axis of the bow (X—X in FIG. 1) and are directly involved in the formation of said bow will receive first attention in the following description of the details of the machine.

Referring to FIGS. 1, 4, 13 and 14, steel blocks 47 and 48 are mounted on face A of master frame plate 34 in horizontal parallel spaced relation, the first of these blocks being flush with the lower edge of rectangular recess 35. The block 47 is vertically bored to provide a bearing for a tubular mandrel shaft 49 and the block 48 is concentrically bored to receive a unidirectional annular clutch 50 which performs the function of preventing clock-wise rotation of shaft 49 while freely permitting anti-clock-wise rotation thereof. A collar 51 is provided on shaft 49 to support the latter on block 48 and another collar 52 is provided on said shaft to support a unidirectional clutch 53 through which said shaft extends and which is located between collar 52 and block 47. Mounted on unidirectional clutch 53 is a pinion gear 54 which, as will be made clear hereinafter, is employed for rotating shaft 49 in an anti-clock-wise direction. Mounted on the bottom of block 48 is a light, spring biased brake 55 which applies a light friction to shaft 49 so as to halt rotation of said shaft when positive rotation thereof ceases. In the space between collars 51 and 52, tubular shaft 49 is provided with diametrally opposite vertical slots 60. Slidably received in tubular shaft 49 and extending from opposite ends of the latter is a needle mounting shaft 61, the latter having a pin 62 which extends into slots 60 so as to give shaft 61 a splined relation with tubular shaft 49. The upper end of shaft 61 has a tapped axial opening into which a threaded needle mounting head 63 is screwed. The head 63 is the same diameter as shaft 61 and is provided with a plurality of needles 64 which extend vertically upwardly therefrom. For making the smaller sizes of bows, two needles 64 are adequate, but for making the larger sizes it is found desirable to employ a head 63 having three needles.

Mounted rigidly on the upwardly extending end of tubular shaft 49 is a bow-forming mandrel 65 which has an inside diameter equal to that of tubular shaft 49 so that the upper portion of shaft 61 is freely slidable vertically in said mandrel. Mandrel 65 terminates at its upper end in an annular staple-clenching anvil 66 the upper face of which is dished so as to clench staple points inwardly in the operation of stapling together the various elements of a bow. This stapling operation is not interfered with by needles 64 because the latter are withdrawn downwardly with the shaft 61 immediately preceding the consummation of the stapling operation. This is effected by a lever 67 which is pivotally mounted on a pin 68 provided on plate 34 and which has a pair of pins 69 which extends outwardly between a pair of washers 70 provided on the lower extending portion of needle mounting shaft 61 and held in spaced relation with each other by lock nuts 75 which are adjustable set on threads 76 formed on the lower end of said shaft.

The outer end of lever 67 is pivotally connected to the lower end of a link 77 the upper end of which pivotally connects with the outer end of an arm 78 located on the opposite side of plate 34 above the recess 35, the inner end of arm 78 being pivoted at 79 on face B of plate 34. Arm 78 is biased upwardly by a spring 80 so as to hold the shaft 61 in its uppermost position in which the pin 62 engages the upper ends of slots 60 in tubular shaft 49. This causes the needles 64 to normally extend upwardly a substantial distance above the upper face of anvil 66 as shown in FIG. 13. Arm 78 has a threaded aperture near its pivot 79 for receiving a set screw 81, the purpose of which will be made clear hereinafter.

Mounted horizontally on face B of plate 34 and extending a slight distance into recess 35 (FIGS. 3, 13 and 14), is a scissors mounting bar 82 which is adjustable lengthwise to determine the distance which it extends into said recess. Mounted on the extending end of said bar at right angles therewith is a fixed scissors blade 84 which is pivotally connected at one end by a pin 85 with a swingable scissors blade 90 which is spring biased into frictional face-to-face engagement with said fixed blade.

Blade 90 is provided with a slot 91 for actuating said blade in a manner to be made clear hereinafter. Extending through a hole in mounting bar 82 (FIGURES 6 and 13) and brazed securely therein is a coiled tube 92 which terminates in an upwardly pointing air jet 93 close to the axis X—X of the bow-forming mandrel 65 and beneath the path along which ribbon is being fed to said mandrel, as will be made clear hereinafter.

Mounted on face A of plate 34 directly above and in axial alignment with mandrel 65 is a stapling gun 95. For thus mounting and effecting vertical movement of gun 95, under-cut guide members 96 and 97 are fixed vertically and in parallel spaced relation on said plate, so as to confine and vertically guide a gun mounting plate 98 having a sheet metal yoke 99 thereon, into which said gun fits and to which the gun is secured as by screws 100. A small rectangular metal block 105 is secured to the upper end of plate 98 by a pin 106 which extends rearwardly through a vertical slot 107 formed in plate 34 so as to project outwardly beyond face B of said plate directly above arm 78 but normally spaced a substantial distance thereabove as shown in FIG. 3. Also mounted on face A of plate 34 on axis X—X directly above the gun 95 is a gun actuating air cylinder 108 having down and up air inlets 109 and 110 respectively, the piston rod 111 of said cylinder being secured to block 105.

Referring now to FIGS. 12, 17 and 18, a fixed, horizontally slotted tape shear blade 112 is mounted on face A of plate 34 so that the slot 113 thereof is disposed just below the upper horizontal edge of recess 35. Mounted on the back side of the stapling gun 95 at its lower end is a bar 114 on the back side of which is carried a movable tape shear blade 115, the lower edge of which is just above slot 113 when stapling gun 95 is in its uppermost position as shown in FIGS. 17 and 18.

Slidably mounted in a vertical hole provided in the inner end of bar 114 is a pin 119 having a head 120 similar to that of a carriage bolt, this pin being biased upwardly by a spring 121 the upper end of which is secured to a screw 122 mounted on the gun mounting yoke 99. When gun 95 is in its up position, the upper end of pin 119 engages a shoulder 123 provided on gun guide member 97 which spaces head 120 from the bottom of the gun. When gun 95 starts down pin head 120 yieldably clamps a tab against the gun bottom, as will be made clear hereinafter. Bar 114 also has a pin 124 which extends horizontally from the inner end thereof and through slot 91 provided in swingable ribbon scissors blade 90.

Stapling gun 95 is air actuated to drive a staple downwardly from the lower end thereof in a manner well known in the stapling art and air for accomplishing this purpose is supplied to said gun through a hose 125.

The air actuation of stapling gun 95 and the cylinder 108 which vertically reciprocates said gun is accomplished through a two-way valve 126 which is supplied through a hose 127 and said valve selectively delivers said compressed air either through a hose 128 to the "down" air inlet 109 of cylinder 108 or through a hose 128 to the "down" air inlet 109 of cylinder 108 or through a hose 129 which leads to the "up" air inlet 110 of said cylinder and also connects with hose 125 for actuating stapling gun 95 to cause it to drive a staple from the lower end thereof. The two-way valve 126 is actuated by a solenoid 130 to cause air cylinder 108 to shift stapling gun 95 to its lowermost position and by a solenoid 135 to actuate the stapling gun 95 to cause it to drive a staple therefrom and immediately thereafter to return said gun to its uppermost position shown in FIG. 1.

Mounted on face B of plate 34 directly opposite the location of the mounting of stapling gun 95 on face A, is a pressure adhesive tape feeding device 136 which includes a pair of vertical rectangular plates 137 and 138 which are coaxially bored to provide bearings for a shaft 139 on which a roller 140 having a roughened outer surface is mounted. Slots 141 are also provided in said plates for receiving trunnions 142 of a shiftable roller 143 which is biased towards rolling engagement with roller 140 by coil springs 144 trapped in slots 141. A unidirectional clutch 145 is mounted on one end of shaft 139 and an arm 147 is mounted on said clutch so that as said arm is rocked, rotation in a clock-wise direction only is intermitting transmitted to roller 140 (as shown in FIG. 12). Pivotally mounted on a pin 148 provided on a plate 149 which is fixed on the plate 138 is an air cylinder 151. Said cylinder has a piston rod 152 which is pivotally connected to crank arm 147 of the device, there being a spring in said cylinder which retracts said rod when said cylinder is de-energized. Thus the intermittent delivery of compressed air to cylinder 151 causes a rocking of arm 147 and an intermittent clock-wise rotation of roller 140. The air actuation of cylinder 151 is accomplished through air delivered through a hose 153 which also connects to a pipe 154 which terminates in the form an an air jet 155 which is located close to and in the same plane as axis X—X and just below the lower edge of fixed tape shear blade 112.

Suitable means (not shown) is provided to be supported on angle iron standard 45 for supporting a coil of pressure adhesive tape 156, formed preferably of heavy paper with a thin strip temporarily covering the pressure adhesive layer thereof, and which is adapted to be divided into short pieces each of which forms a pressure adhesive mounting tab 157 for one of the ribbon bows 46 which the machine 30 is provided to make. Tape 156 fed downwardly from said coil extends between rollers 140 and 143 and is then threaded through the slot 113 in shear blade 112 so that this tape extends directly under the stapling gun 95 as shown in FIG. 12. When the tape 156 is thus fed under the stapling gun 95, one edge thereof extends between the head 120 of pin 119 and the bottom of the gun. The purpose of this will be made clear hereinafter.

Mounted on lower deck 32 of the structural steel base 31 of machine 30 is an electric motor 165 and bearings 166 and 167 for rotatably supporting a counter shaft 168. This shaft has a relatively large diameter pulley 169 which is belt driven from said motor so as to continually rotate shaft 168. Provided on this shaft is a sprocket 170 which is connected by an endless chain 171 with a sprocket 172 mounted on a shaft 173 which journals in a suitable bearings provided by the plate 34 near the upper left corner of face B thereof said shaft extending beyond face A of plate 34 (FIG. 1) and having mounted thereon a ribbon feed roller 174. A guide sprocket 175 and an idler sprocket 180 mounted on an arm 181 are provided for conducting an endless chain 171 around other working parts of the machine said chain being trained about sprockets 170 and 172 for driving shaft 173 from shaft 168. Freely rotatable on counter shaft 168 is a drive pulley 182 which is provided with an electric clutch 183 which, when energized, connects said pulley with said counter shaft.

Master frame plate 34 and vertical bar 40 have aligned bores which provide bearings for a cam shaft 184 which is provided, adjacent plate 34, with an electrically actuated brake 185, said shaft extending through said plate and having mounted on the extending end thereof a mandrel rotating cam 186 and a ribbon shuttle actuating crank arm 187. Between the electric brake 185 and the vertical bar 40, shaft 184 has fixed thereon a shuttle control cam 188 and a large diameter driven pulley 189. Shaft 184 also projects forwardly through vertical bar 40 and has mounted on the projecting end thereof a bow-forming cycle control sprocket 190. The driven pulley 189 is connected to the drive pulley 182 by an endless belt 195.

Pivotally mounted on the extending end of a stud 196 which is fixed on face B of plate 34 beneath shaft 184 is an arm 197 having a cam follower roller 198 which is positioned to follow shuttle control cam 188. Pivotally connected at its upper end to arm 197 is a link 199 which inclines downwardly as shown in FIG. 3 to pivotally connect to the upper end of a short crank arm 200 provided on a short shaft 201 which journals in a hole provided in plate 34 near the lower edge thereof and extends beyond the opposite face of said plate to mount thereon another short crank arm 202 the purpose of which will be made clear hereinafter.

Connecting a pin 203 provided on plate 34 with arm 197 is a coil spring 204 which constantly biases cam follower roller 198 against cam 188 so as to cause short crank arm 202 to rock cyclically with the rotation of cam shaft 184.

Pivotally mounted on the upper spacer 39 adjacent the vertical bar 40 is an arm 210 on the extremity of which is rotatably mounted an idle sprocket 211 which is in radial alignment with bow-forming control sprocket 190. Also radially aligned with said sprockets is a sprocket 212 which is pivotally mounted on the upper outer face of vertical bar 40, these three sprockets being connected by an endless chain 213 trained thereabout. Mounted on bar 40 so as to encompass a vertical portion of chain 213 disposed between sprocket 190 and sprocket 212 is a switch box 214 providing a guide wall 215 disposed opposite said vertical chain flight and on the opposite side therefrom relative to four limit switches S1, S2, S3 and S4 which are mounted within said box with the actuating arms of said switches extending close to said vertical chain flight. A switch actuating block 216 is connected near its mid point to one of the links of chain 213 with said block extending towards the arms of said switches so that each switch in turn is actuated by engagement of said block therewith, with this exception: switches S1 and S2 are located abreast of each other and the arm of switch S2 is in alignment with block 216 but switch S1 is located alongside the path followed by said block. Said block is therefore provided with a cylindrical bar 217 which extends transversely therefrom in the direction of switch S1 so as to actuate the latter when said bar passes switch S1. This actuation, however, is only temporary and the effect of this will be made clear hereinafter.

Referring now particularly to FIGS. 1, 5, 6, 7, 8, 9 and 10 a mandrel rotation control mechanism 218, a ribbon shuttle mechanism 225 and a ribbon feed mechanism 226 will now be described in the order given.

The rotation of bow-forming mandrel 65 and a significant variation between the angle with which the mandrel is rotated in the first loop-forming sub-cycle in each bow-forming cycle from the other loop forming sub-cycles therein is accomplished by the mandrel rotation control mechanism 218. This includes a rack 227 which is slidably mounted between the lower surface of the steel block 47 and a roller 228 mounted on face A of plate 34 just beneath said rack so that the teeth of the rack mesh with the pinion gear 54 provided for unidirectionally rotating the mandrel 65. The rack 227 is formed as a continuation at one end of a rod 229 and said rack and rod are disposed substantially horizontally throughout their operation. The rear extremity of rod 229 is pivotally connected to the upper end of an approximately upright lever 230, the lower end of which is pivotally connected at 231 to a pin provided on the master frame plate 34. Pivotally connected to lever 230 is piston rod 232 of a constant bias air pressure cylinder 233 which is pivotally mounted at 234 on plate 34 and is constantly supplied with compressed air through a hose 235.

Lever 230 is provided with a vertical slot 240 in which pins 241 and 242 are adjustably clamped by a suitable means provided for this purpose. Spaced from lever 230 and pivotally mounted intermediate its ends 243 on plate 34 is a cam following lever 244. The upper end of this lever carries the cam following roller 245 which is biased into constant engagement with mandrel rotating cam 186. Towards the lower end of lever 244 bolts 246 and 247 are provided for pivotally connecting primary and secondary links 248 and 249 to said lever. The opposite ends of these links pivotally connect respectively with pins 241 and 242 of lever 230.

As clearly shown in FIGS. 10 and 11, links 248 and 249 are telescopic in character and are limited to acting through compression applied lengthwise thereto. Thus primary link 248 includes a tube 250 at one end of said link and a rod 255 at the other end of said link so that this link is indefinitely extensible. The same is true of secondary link 249 with this exception: Primary link 248 has no provision made for automatically varying its minimum compressive length but such a provision is made in link 249 by making said link with a tubular member 257 at one end and with a rod member 258 at the other end which telescopes within said tubular member and then providing said tubular member with an air controlled cylinder 259 having a plunger 260 which may optionally be air propelled cross-wise into tubular member 257 so as to block further penetration of said tubular member by rod member 258 when said penetration is only partially accomplished thereby giving link 249 an effective compressive length which is in excess of that normally existing in said link. To control the effetive length of link 249 in this manner, air cylinder 259 is supplied with compressed air through a hose 261. It is to be noted that the opportunity for plunger 260 to be introduced into the path of rod member 258 of link 249 occurs only because this link is pivotally connected at its opposite ends with levers 230 and 244 so that as air in constant bias air cylinder 233 causes cam follower roller 245 to follow cam 186 to the low point of said cam, link 249 is telescopically extended by partial withdrawal of the rod member 258 from the tubular member 257 so that at this point in the operation of the mandrel rotation control mechanism 218, an opportunity is afforded by supplying air through hose 261 to propel plunger 260 across the path of rod member 258 as shown in FIG. 10 and thereby prevent the telescopic contraction of link 249 in the sub-cycle following such obstruction, so that a greater angular degree of rotation is transmitted from the cam 186 to mandrel 65 than is normally transmitted where link 249 does not have its effective length thus increased.

The ribbon shuttle mechanism 225 is actuated uniformly during all of the sub-cycles of a bow-forming cycle of the machine 30, and this is done from cam shaft 184 through shuttle actuating crank arm 187 and shuttle control cam 188. This mechanism includes an adjustable throw lever 270 which is pivotally mounted on pin 271 on face A of plate 34 so that the upper end of this lever is approximately in the horizontal plane of the upper end of bow-forming mandrel 65. Provided on this lever is an arcuately slotted plate 272, the slot 273 of which is provided with an adjustably positioned block 274 upon which is pivotally mounted one end of a link 275, the opposite end of which pivotally connects to the outer end of crank arm 187. Thus as cam shaft 184 rotates, lever 270 is swung about its pivot pin 271 through an angle depending upon the location of block 274 in slot 273 of said lever. The distance which shuttle plate 276 is thus caused to retract from mandrel 65 during each loop-forming sub-cycle of the machine is determined by the location of the block 274 in slot 273. The diameter of bows made on machine 30 is predetermined by this adjustment.

Referring now to FIG. 1, 6, 9, 13, 14 and 16, the ribbon shuttle mechanism 225 also includes shuttle plate 276 the rear end of which is pivotally connected by a pin 277 to the upper end of adjustable lever 270 and which is pivotally connected near its forward end with the upper end of a link 278, the lower end of which is pivotally connected to the outer end of crank arm 202.

The shuttle plate 276 is provided at its front end with a pair of thin sheet metal plates 279 and 280 which are secured to the shuttle plate 276 by a pair of vertical studs 281 between which is pivotally mounted a one-way ribbon clutch dog 282. Dog is spring biased downwardly by a spring 283 whereby said dog permits ribbon to pass forwardly therebeneath while plate 276 is being retracted but grips the ribbon and prevents reverse movement of the ribbon relative to the shuttle plate 276 while the latter is advancing. Portions of the thin plates 279 and 280 which extend beyond the shuttle plate 276 are shaped so as to be spaced a slight distance apart and are held in this spaced relation by rivets 284 provided along opposite edges of said thin plates. Vertically aligned longitudinal notches 285 are provided in the ends of thin plates 279 and 280, and transverse slots 286, 287 and 288 are provided in the upper thin plate 279 for selectively guiding ribbon of different widths, one of said slots being provided for accommodating each of three different widths of ribbon. Whichever width of ribbon is being used at a given time, it is thus fed downwardly through the slot of the right size to accommodate the same and then forwardly between this plates 279 and 280 and outwardly between the ends of said plates.

At spaced points along shuttle plate 276, the latter is provided with small diameter tubular rollers 289 which are rotatably supported upon heavy cotter pins 290 the opposite ends of which are supported by the eyes of cotter pins inserted downwardly through suitable holes provided in the shuttle plate 276.

The ribbon feed mechanism 226 includes a lever 291 which is pivotally mounted on a pin 292 provided on plate 34 in the upper right corner of face A thereof. This lever carries a roller 293 and is spring biased by spring 294 to press said roller downwardly into rolling relation with ribbon feed roller 174. As roller 174 is constantly rotated in the direction of the arrow shown in FIG. 1, whenever motor 165 is running, a web of ribbon 296 is continually fed from right to left by said roller so long as roller 293 is pressed downwardly on said web to compress the same against the feed roller 174. Lever 291 is provided, however, with a solenoid 300 which, when energized, lifts roller 293 out of pressural contact with said web of ribbon so that the latter will not be fed between said rollers until solenoid 300 is de-energized.

A metal box 301 is mounted on face A of plate 34 adjacent to and just below ribbon feed roller 174 and a pair of rollers 302 and 303 are provided on plate 34 at the upper opposite edges of box 301 to support a loop 304 of ribbon 296 within said box for the purpose of providing a reserve supply of ribbon ready for use in the bow-forming cycles of machine 30 and yet operative to prevent an excessive amount of ribbon being fed into box 301. To effect this purpose, a photoelectric cell 305 is mounted on the inside of one of the sidewalls of box 301 near the bottom thereof and a light beam is projected by a lamp 306 disposed outside said box opposite a hole in the sidewall directly opposite said photoelectric cell so that said beam traverses the space in said box and impinges upon said photoelectric cell whenever an opaque curtain 307 which hangs downwardly in the middle of the box is lifted by said loop 304 of ribbon 296 which is passing through box 301 at the time. The circuit of the photoelectric cell 305 is connected through a suitable relay 308 with the circuit of the solenoid 300 so as to cause this solenoid to be energized and lift the roller 293 to discontinue the feeling of said web of ribbon 296 whenever said loop has accumulated to the extent that it extends downwardly far enough to allow curtain 307 to interrupt the beam of light impinging upon photoelectric cell 305. The diameter of ribbon feed roller 174 is selected so that the web of ribbon 296 will be fed into box 301 at a slightly greater rate than this ribbon will be used by the machine 30 so that there is never a lack of ribbon available for use by said machine.

The machine 30 is provided with a compressed air supply line 315 which supplies compressed air continuously to hose 235 for keeping the air cylinder 233 constantly biasing the cam follower roller 245 against the mandrel rotating cam 186. This supply line also leads to solenoid valve 316 which controls the supply of compressed air to hose 261 leading to air cylinder 259 which modifies the rotation of the mandrel during the first loop-forming sub-cycle of each bow-forming cycle of machine 30. Supply line 315 also leads to solenoid valve 317 which controls the supply of compressed air to hose 153 which actuates air cylinder 151 feeding the tab forming tape beneath the staple gun and emitting a blast of air from air jet 155 to eject a finished bow from the machine. Air supply line 315 also supplies compressed air constantly through hose 318 to air jet 93 which constantly impinges upwardly on the ribbon as the latter is being incorporated in a bow. The main air supply line 315 also furnishes compressed air to hose 127 which supplies compressed air for operating the stapling gun 95 and its vertically reciprocating air cylinder 108.

In addition to the electric switches already identified hereinabove, the machine 30 includes switch S5 which is located just below the set screw 81 provided on arm 78 so that this switch is actuated when said arm is depressed by engagement thereof by pin 106 at the conclusion of the down travel of the stapling gun 95, which actuates the up solenoid 135 which simultaneously actuates the gun 95 to drive a staple downwardly and supplies air to the lower end of cylinder 108 t lift said gun to its "up" position. The electric system also includes switch S6 which is mounted on the guide member 97 so that said switch will be bypassed by rectangular block 105 of the stapling gun when the latter travels downwardly but will be actuated by said block as the gun returns to its upper limit of travel. The function of this switch will be more fully explained in the description of the operation in which it starts a new bow-forming cycle in the automatic operation of machine 30.

Switch S7 is a push-button switch for manual cycling stapling gun 95. Switch S8 is provided to be opened when it is desired to stop machine 30 at the close of any bow-forming cycle and switch S9 is the main line switch which directly starts and stops motor 165 and thus may be used to stop machine 30 at any time during its operation.

The electric circuit of the machine 30 is adapted to operate on 115 volts, A.C. current, but the electric clutch 183 and electric brake 185 require 16 volts direct current. This is supplied through a rectifier 325 as shown in FIG. 21.

OPERATION

The drawings show the parts of the machine approximately as they are located when the machine has been closed down by opening switch S8 during a bow-making cycle so that at the close of this cycle the machine stops.

Figure 19:
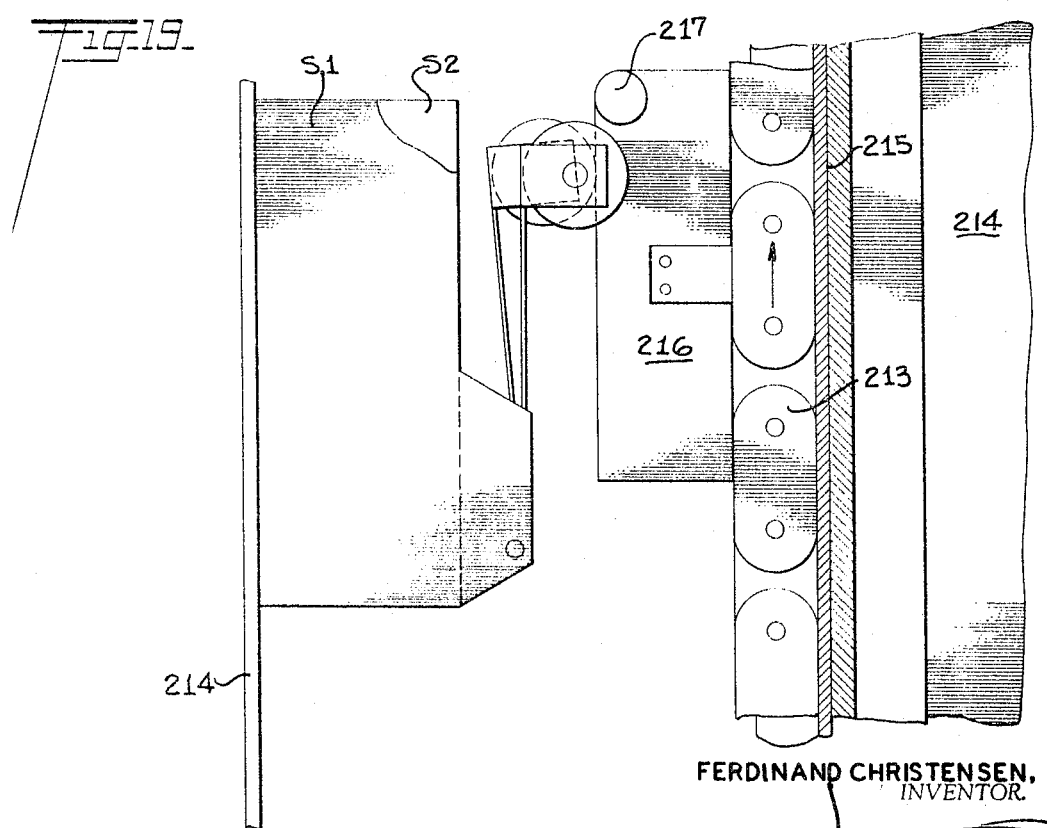
FIG. 19 is an enlarged detail view of the switch for actuating the valve for lowering the stapling gun of the invention and the switch which opens the clutch and applies the brake of said machine just after said switches have been actuated by the switch control lug on the cycle controlling chain of said machine at the close of a bow-forming cycle.

The halting of the machine takes place when the chain block 216 actuates switch S2 after actuating switch S1 (which is without effect because of the opening of the circuit of the latter switch by opening switch S8). The function of switch S2, when actuated, is to open the electric clutch 183 and apply electric brake 185, and it performs this function so as to quickly halt rotation of cam shaft 184 (which drives the control chain) so that chain block 216 is halted while holding switch S2 in actuated position as shown in FIG. 19. This causes the brake 185 to be positively applied so long as the main circuit of the machine remains closed by the main line switch S9 being closed. The motor 165, of course, also continues running as this is directly controlled only by main switch S9.

A bow 46 formed during the final bow-making cycle of the machine before the machine is halted as above described, is then finished and the finishing of this bow is accomplished by pressing push button S7 momentarily. This switch operates directly on solenoid 130 controlling valve 126 and causes the latter to actuate air cylinder 108 to drive the staple gun 95 downward where it staples an adhesive paper tab 157 onto the bottom of said bow, with the result that with the return of gun 95 to its upward position the bow is lifted with the gun and is suspended therefrom by said tab being gripped by pin head 120.

The rising of the gun 95 causes this to actuate switch S6 which starts a new bow-making cycle if the main switch S9 is not opened immediately. The opening of switch S9 at this point of time shuts off the motor and halts the operation of the machine with the bow made in the final cycle completed and suspended from the gun. This bow may then be removed manually.

With the machine thus stopped it may be started again for continuous automatic cycling operation by closing main line switch S9 which starts the motor, and then closing switch S8 and pushing push-button switch S7 to close the same temporarily. The temporary closing of switch S7 under these circumstances actuates valve 126 to admit air to the upper end of cylinder 108 so as to move the gun 95 downwardly to its lowermost position. This would normally result in the stapling of a bow (formed as shown in FIG. 26) to produce a completed bow 46 as shown in FIGS. 27 and 28. As no bow is at this moment formed on the mandrel needles 64 of the machine, the staple delivered from the lower end of the gun and clenched on the anvil 66 is displaced from the latter when the needle shaft 61 rises through the middle of the anvil as the gun rises following the actuation of switch S5 by the gun as it reaches the lower extremity of its movement. The anvil is thus clear, and the needles 64 are raised by spring 80 to extend upwardly for the formation of a ribbon bow 46 thereon.

As the gun 95 approaches its uppermost position, the block 105 on the gun mounting plate 98 engages switch S6 and actuates this to initiate a bow-forming cycle. This is effected by switch S6 overriding switch S2 thereby releasing the brake and closing the clutch which starts the cam shaft 184 rotating. Switch S6 is actuated by placing it in the opposite position from that in which it is shown in FIG. 21 for a sufficient interval to cause the control chain to travel far enough in the direction of the arrow shown in FIG. 19 for the switch actuating block 216 on chain 213 to travel past the roller of switch S2 so that this switch is spring actuated back to its normal position as shown in FIG. 21 before switch S6 returns to its normal position as shown in this view. This causes the clutch 183 to remain engaged and the brake 185 disengaged throughout the current bow-forming cycle.

Each such cycle is madeup of a series of sub-cycles in each of which, excepting the first sub-cycle, one loop of the bow is formed by impaling the ribbon 296 on needles 64. The first of these sub-cycles results merely in impaling an end portion of the ribbon 296 on said needles as a result of the foremost extremity of the ribbon shuttle traveling through an orbit as shown by the arrows 319 in FIG. 13 and with the result shown in FIG. 23.

The second sub-cycle differs from all the others in that the bow-forming mandrel 65 is rotated 360° during the advancing of the ribbon shuttle in that sub-cycle so that when the ribbon shuttle impales the ribbon on the needles 64 at the conclusion of said sub-cycle, it forms a cylindrical loop 320 as the first loop of the bow, as shown in FIG. 24. This exceptional characteristic of the second sub-cycle is caused by the actuation of switch S3 by the switch actuation block 216 on the control chain 213 which opens solenoid air valve 316 admitting air to the air cylinder 259 of the secondary actuating link 249 of the mechanism for rotating the bow-forming mandrel which causes said link to be effectively lengthened during said second sub-cycle as shown in FIG. 7. This increases the distance that the mandrel rotating rack 227 travels during that sub-cycle so that said mandrel is rotated 360°.

The admission of air to said secondary link 249 is effective in lengthening said link only during said sub-cycle so that in all of the other sub-cycles the primary actuating link 248 uniformly effects rotation of the bow-forming mandrel during each such sub-cycle through an angle determined by adjusting the effective length of said primary link. This link is generally adjusted so that said angle of rotation falls within the range of 200° to 235°. In making the bow illustrated in FIG. 28, the primary link rotates the mandrel about 215° in forming each loop after the first.

In making this bow, the control chain 213 is of such length as to cause sixteen sub-cycles to be performed in the formation of each bow. Two of these sub-cycles are required in the production of the first or central loop 320 of the bow (see FIG. 24) so that each bow has a total of fiteen loops. Each loop 321 formed during a cycle in which the anvil rotates only 215° is a twisted or conoidal loop as shown in FIG. 25. When fourteen loops of this type have been formed, one on top of the other by successively impaling the ribbon on the mandrel needles 64, the bow has the appearance shown in FIG. 26.

As the sub-cycle, in which the final twisted loop is added to the bow, is concluded, the control chain 213 completes its cycle of rotation to the point where the switch actuating block 216 moves upwardly into actuating relation with switch S2 so as to hold this switch open. This opens clutch 183 and applies brake 185 so as to halt rotation of the cam shaft 184. At the same time the horizontal bar 217 formed on said block engages the roller of switch S1 and temporarily closes that switch thereby energizing solenoid 130 and actuating two-way valve 126 to admit air to the upper end of gun actuating cylinder 108. As the gun is thus moved downward, shear blade 115 traveling with the gun, cuts off a tab 157 from the end of tab forming tape 156, and this tab is automatically clamped against the bottom of the gun by the head 120 of slidable pin 119, when this is freed by downward movement of the gun, so that spring 121 may bias pin head 120 upwardly against said tab. This tab 157 is thus retained in place in position between the gun and the bow and is stapled to the bow when the gun reaches its downwardmost position. Downward travel of the gun also actuates swingable scissors blade 90 by the pin 124 carried by said gun extending into the slot 91 of said blade, so as to cut the ribbon from which the bow is made at a point between the ribbon shuttle and the bow so as to leave a substantial length of ribbon extending outwardly between the bow and the adhesive tab 157 when the latter is stapled to said bow.

The downward travel of gun 95 also functions through the pin 106 extending laterally therefrom through vertical slot 107 in plate 34, to depress the upper arm 78 of the mechanism which retracts the bow assembly needles 64 downwardly in the mandrel 65 just as the gun 95 descends to staple together the parts of the bow. As the arm 78 reaches its downward limit of travel it actuates switch S5 which energizes solenoid 135 which performs the dual functions of causing the gun to deliver a staple through said tab and the overlapping ribbon portions of the bow against which it rests downwardly and immediately thereafter returns upwardly to its uppermost position. As gun 95 approaches its upwardmost position, it actuates switch S6 and thereby automatically initiates another bow-forming cycle.

The completed bow 46 formed in the cycle just described hereinabove remains suspended on the gun when the latter returns upwardly until the following bow-forming cycle has advanced to the point where switch control block 216 actuates switch S4 which admits compressed air to cylinder 151 for feeding adhesive tap 156 to advance another adhesive tab 157 under said gun for use in the ensuing bow-forming cycle and simultaneously delivers a powerful jet of air from the nozzle 155 positioned just behind the bow suspended from the bottom of the gun so as to blast this bow at a high velocity along a path which delivers the bow into a cardboard shipping box provided to receive the same.

The jet of compressed air which is constantly emitted upwardly from jet nozzle 93 against the length of ribbon 296 paid out between the needles 64 and the ribbon shuttle plate 276 as the latter retracts following the impaling action of each sub-cycle, has the valuable purpose of causing the ribbon to bend upwardly between said needles and said shuttle plate as soon as the latter reverses its direction of its movement and starts moving towards said needles. The needle latch dog 282 slides over the ribbon as the shuttle retracts so that said ribbon is readily paid out from the forward end 279 of the shuttle 276 during retraction of the latter, but said dog grips the ribbon as the shuttle plate 276 again starts toward the needles so that the length of ribbon just paid out between said needles and said shuttle plate freely responds to said jet of air and arches upwardly as the forward end of the shuttle plate rises while advancing towards and over said needles. The rotation of the needles during this sub-cycle, however, takes place in such a timed relation with the advancing of the shuttle plate that the upwardly arched ribbon length is caused to flip downwardly as the shuttle end 279 approaches its position over the needles.

This action results in the loops of a bow being all formed downwardly from the horizontal plane of anvil 66 instead of upwardly therefrom, and in the decorative side of the ribbon always being located on the outside of all the loops.

The claims are:

1. A method of making a bow from a single length of ribbon embracing the steps of forming a loop in an end portion of said ribbon comprising a single turn annular coil, securing together temporarily the overlapping portions of said ribbon forming said coil approximately on the axis of said bow; holding said ribbon at a point spaced from said axis and a distance therefrom to provide a sufficient length of said ribbon for forming a second loop for said bow, rotating said first loop on said axis through a sufficient angle to twist the portion of ribbon provided for said second loop, moving said ribbon at the point so held whereby said ribbon at said point crosses the axis of said bow and overlies the ribbon portions comprising opposite ends of said first loop, temporarily securing a portion of said ribbon at said point at which the same is held to the terminal portions of said first loop, repeating the aforesaid steps employed in forming said second loop to form a sequence of conoidal loops the formation of each of which coincides with rotation of the previously formed loops of the bow about the axis of the latter through a pre-determined angle which is in excess of 180°, and permanently securing together the portions of said ribbon which are caused to cross the axis of said bow in the formation of the latter, the portions of said ribbon which overlap each other where they cross the axis of said bow in the formation of said loops lying flat against each other.

2. A method as recited in claim 1 wherein the initial step thereof consists in holding said end portion of said ribbon near its extremity and rotating said end portion 360°, and feeding said ribbon toward said end portion as the latter is so rotated to provide a sufficient amount of ribbon material to form said first loop in the shape of a single turn coil.

3. A fully automatic ribbon bow-making machine comprising: a bow-forming mandrel; means for rotatably mounting the same; a plurality of needles extending axially from said mandrel; means for feeding a length of ribbon towards said mandrel and impaling the same on said needles in a series of sub-cycles each of which, after the first sub-cycle, forms a loop of said bow; means for rotating said mandrel through a predetermined angle and in a given direction during each of said sub-cycles to cause the impaling of said ribbon onto said needles to form successively from said ribbon a series of radially arranged loops; means for concurrently withdrawing said needles from said successive loops of ribbon and securing together said loops by a means separate from said needles whereby the bow formed of said loops may be removed from said machine and retained in the form in which it was produced as aforesaid; and mechanism for automatically actuating all the aforesaid means coordinately and cutting said ribbon after each bow is completed, whereby said ribbon is automatically converted into a series of individual ribbon bows.

4. A machine as recited in claim 3 wherein means is provided for automatically controlling the angle of rotation of said mandrel in forming said loops, and causing said mandrel to rotate through an angle of approximately 360° during the first loop-forming sub-cycle whereby a loop is formed in said sub-cycle comprising a single-turn coil of ribbon which occupies the central area of the bow when this is completed and substantially covers the interior structure of said bow, said control means then causing said mandrel to rotate during sub-cycles following the formation of said central loop, through angles within the bracket of 200° to 240° whereby conoidal loops are formed during said subsequent sub-cycles, which are circumferentially spaced from each other about the axis of the bow.

5. A machine as recited in claim 3 wherein said ribbon feeding means comprises a ribbon shuttle; and power means which reciprocates said shuttle automatically towards and away from said mandrel in a plane at right angles to the latter, said power means shifting said shuttle positively upwardly to a level above said needles as it approaches said mandrel and then positively downwardly when said shuttle arrives above said needles so as to positively impale the ribbon fed by said shuttle onto said needles, said power means then retracting said shuttle in its return reciprocatory movement to cause the ribbon in said shuttle to be paid out therefrom.

6. A machine as recited in claim 5 wherein said jet means is provided directing an air jet against said ribbon as it is paid out from said shuttle and subsequently when the movement of said shuttle is reversed to form the length of ribbon thus paid out into a loop as said mandrel rotates during the current loop-forming sub-cycle.

7. A machine as recited in claim 3 wherein means is provided for delivering a tab of paper or the like which is surfaced with pressure adhesive and applying said tab to the back of said bow so as to be secured to said bow by said securing means to provide a means for utilizing said pressure adhesive for mounting said bow on an object.

References Cited

UNITED STATES PATENTS

| | | |
|---|---|---|
| 2,103,404 | 12/1937 | Bolyard. |
| 2,257,154 | 9/1941 | Bleyer. |
| 2,933,223 | 4/1960 | Kravig et al. |
| 3,180,542 | 4/1965 | Carmichael. |
| 3,223,299 | 12/1965 | Kerrigan et al. |
| 3,249,269 | 5/1966 | Bock et al. |
| 3,318,497 | 5/1967 | Nimmo. |

JORDAN FRANKLIN, Primary Examiner

GEORGE V. LARKIN, Assistant Examiner

U.S. Cl. X.R.

161—9